(12) United States Patent
Harel et al.

(10) Patent No.: US 11,438,415 B2
(45) Date of Patent: Sep. 6, 2022

(54) MANAGING HASH TABLES IN A STORAGE SYSTEM

(71) Applicant: EMC IP Holding Company LLC, Hopkinton, MA (US)

(72) Inventors: Bar Harel, Tel-Aviv (IL); Uri Shabi, Tel Mond (IL); Maor Rahamim, Ramla (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 162 days.

(21) Appl. No.: 16/669,000

(22) Filed: Oct. 30, 2019

(65) Prior Publication Data

US 2021/0136149 A1   May 6, 2021

(51) Int. Cl.
*G06F 13/00*   (2006.01)
*H04L 67/1097*   (2022.01)
*G06F 16/901*   (2019.01)
*H04L 47/215*   (2022.01)
*H04L 67/561*   (2022.01)

(52) U.S. Cl.
CPC ...... *H04L 67/1097* (2013.01); *G06F 16/9014* (2019.01); *H04L 47/215* (2013.01); *H04L 67/561* (2022.05)

(58) Field of Classification Search
CPC .............. H04L 67/1097; H04L 47/215; H04L 67/2804; G06F 16/9014
See application file for complete search history.

(56) References Cited

U.S. PATENT DOCUMENTS

| | | | | |
|---|---|---|---|---|
| 6,122,754 A * | 9/2000 | Litwin | ................ | G06F 11/1076 711/114 |
| 6,173,415 B1 * | 1/2001 | Litwin | ................ | G06F 11/1076 711/114 |
| 6,578,131 B1 * | 6/2003 | Larson | ................ | G06F 16/9014 711/216 |
| 8,572,140 B1 * | 10/2013 | Mittal | ................ | G06F 16/2264 707/899 |
| 10,776,441 B1 * | 9/2020 | Echeverria | .............. | H04L 67/36 |
| 2014/0188885 A1 * | 7/2014 | Kulkarni | ............. | G06F 16/9014 707/739 |

(Continued)

OTHER PUBLICATIONS

U.S. Appl. No. 16/527,468, filed Jul. 31, 2019, Harel et al.

*Primary Examiner* — Cheikh T Ndiaye
(74) *Attorney, Agent, or Firm* — Daly, Crowley Mofford & Durkee, LLP

(57) ABSTRACT

An aspect includes splitting a table of buckets into a fixed number of domains. Each of the domains includes a corresponding subset of the buckets. An aspect also includes providing a spare bucket for each of the subsets of the buckets and providing a metadata structure for each of the domains. The metadata structure includes a head pointer that points to a first bucket of a corresponding subset of the buckets and a spare_bucket pointer that points to the spare bucket of the subset of the buckets. An aspect further includes providing a split-spare bucket pointer that interleaves, during updates to data, among the subset of buckets in the domain. Data subject to the updates is stored in the spare bucket for a corresponding one of the domains. An aspect also includes updating the head pointer and the spare_bucket pointer for corresponding domains in response to updating the data.

20 Claims, 6 Drawing Sheets

(56) References Cited

U.S. PATENT DOCUMENTS

2016/0147569 A1* 5/2016 Cowling ............... G06F 16/22
                                                       718/104
2018/0011852 A1* 1/2018 Bennett .............. G06F 16/2255

* cited by examiner

MANAGING HASH TABLES IN A STORAGE SYSTEM

BACKGROUND

Some storage systems may need to persist (also referred to as "harden") data structures into non-volatile memory block devices (e.g., HHD and SSD). Generally, storage systems performing a simple read-modify-write operation are non-atomic (e.g., a simple read-modify-write operation is RAID over multiple disks (each device may only provide atomicity in its own native block size). However, generally, the read-modify-write operation must be atomic to guarantee consistency in failure condition. This issue is traditionally solved by excessive journal implementations.

SUMMARY

This Summary is provided to introduce a selection of concepts in a simplified form that are further described herein the Detailed description. This summary is not intended to identify key features or essential features of the claimed subject matter, nor is it intended to be used to limit the scope of the claimed subject matter.

One aspect may provide a method for expanding a hash table persisted over an unreliable tier. The method includes splitting a table of buckets into a fixed number of domains. Each of the domains includes a corresponding subset of the buckets. The method also includes providing a spare bucket for each of the subsets of the buckets and providing a metadata structure for each of the domains. The metadata structure includes a head pointer that points to a first bucket of a corresponding subset of the buckets and a spare_bucket pointer that points to the spare bucket of the subset of the buckets. The method further includes providing a split-spare bucket pointer that interleaves, during updates to data, among the subset of buckets in the domain. Data subject to the updates is stored in the spare bucket for a corresponding one of the domains. The method also includes updating the head pointer and the spare_bucket pointer for corresponding domains in response to updating the data.

Another aspect may provide a system for expanding a hash table persisted over an unreliable tier. The system includes a memory having computer-executable instructions and a processor that executes the computer-executable instructions. When executed by the processor, the computer-executable instructions cause the processor to perform operations. The operations include splitting a table of buckets into a fixed number of domains. Each of the domains includes a corresponding subset of the buckets. The operations also include providing a spare bucket for each of the subsets of the buckets and providing a metadata structure for each of the domains. The metadata structure includes a head pointer that points to a first bucket of a corresponding subset of the buckets and a spare_bucket pointer that points to the spare bucket of the subset of the buckets. The operations further include providing a split-spare bucket pointer that interleaves, during updates to data, among the subset of buckets in the domain. Data subject to the updates is stored in the spare bucket for a corresponding one of the domains. The operations also include updating the head pointer and the spare_bucket pointer for corresponding domains in response to updating the data.

A further aspect may provide a computer program product for expanding a hash table persisted over an unreliable tier. The computer program product is embodied on a non-transitory computer readable medium. The computer program product includes instructions that, when executed by a computer, causes the computer to perform operations. The operations include splitting a table of buckets into a fixed number of domains. Each of the domains includes a corresponding subset of the buckets. The operations also include providing a spare bucket for each of the subsets of the buckets and providing a metadata structure for each of the domains. The metadata structure includes a head pointer that points to a first bucket of a corresponding subset of the buckets and a spare_bucket pointer that points to the spare bucket of the subset of the buckets. The operations further include providing a split-spare bucket pointer that interleaves, during updates to data, among the subset of buckets in the domain. Data subject to the updates is stored in the spare bucket for a corresponding one of the domains. The operations also include updating the head pointer and the spare_bucket pointer for corresponding domains in response to updating the data.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Figure 1:
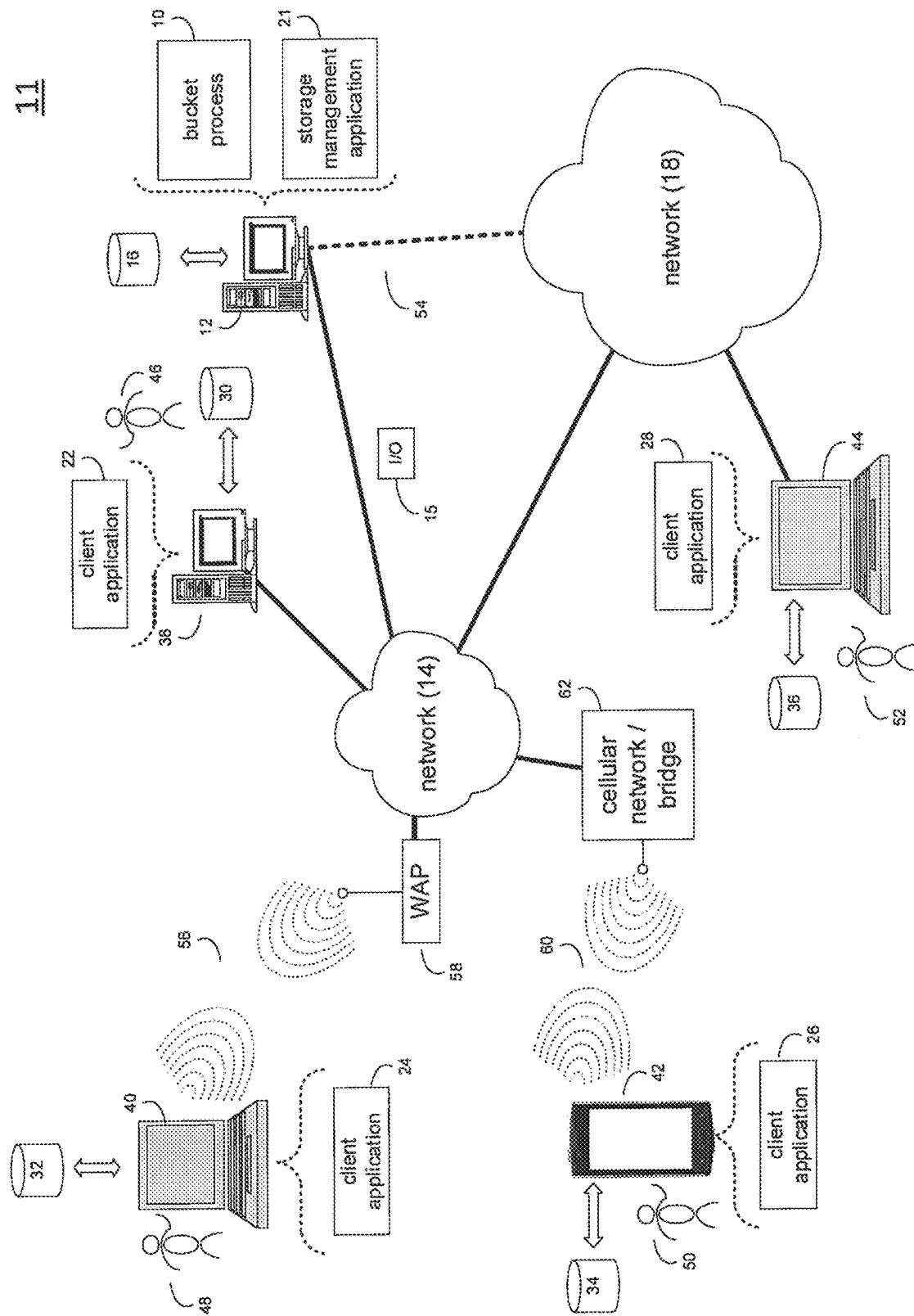
FIG. 1 is an example diagrammatic view of a distributed computing system.

System Overview:

In some embodiments, the present disclosure may be embodied as a method, system, or computer program product. Accordingly, in some implementations, the embodiments may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some embodiments, the present disclosure may take the form of a computer program product on a computer-usable storage medium having computer-usable program code embodied in the medium.

In some embodiments, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the interne or an intranet, or a magnetic storage device. Note that the computer-usable or computer-readable medium may even be a suitable medium upon which the program is stored, scanned, compiled, interpreted, or otherwise processed in a suitable manner, if necessary, and then stored in a computer memory. In the context of the embodiments described herein, a computer-usable or computer-readable storage medium may be any tangible medium that can contain or store a program for use by or in connection with the instruction execution system, apparatus, or device.

In some embodiments, a computer readable signal medium may include a propagated data signal with computer readable program code embodied therein, for example, in baseband or as part of a carrier wave. In some embodiments, such a propagated signal may take any of a variety of forms, including, but not limited to, electro-magnetic, optical, or any suitable combination thereof. In some embodiments, the computer readable program code may be transmitted using any appropriate medium, including but not limited to the internet, wireline, optical fiber cable, RF, etc. In some embodiments, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C-HF or the like. Java® and all Java-based trademarks and logos are trademarks or registered trademarks of Oracle and/or its affiliates. However, the computer program code for carrying out operations of the embodiments may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the embodiments.

In some embodiments, the flowchart and block diagrams in the figures illustrate the architecture, functionality, and operation of possible implementations of apparatus (systems), methods and computer program products according to various implementations described herein. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some embodiments, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some embodiments, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some embodiments, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to FIG. 1, there is shown a distributed computing system 11 including a bucket process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). A SAN may include one or more of the client electronic devices, including a RAID device and a NAS system. In some embodiments, each of the aforementioned elements may be generally described as a computing device. In certain embodiments, a computing device may be a physical or virtual device. In many embodiments, a computing device may be any device capable of performing operations, such as a dedicated processor, a portion of a processor, a virtual processor, a portion of a virtual processor, portion of a virtual device, or a virtual device. In some embodiments, a processor may be a physical processor or a virtual processor. In some embodiments, a virtual processor may correspond to one or more parts of one or more physical processors. In some embodiments, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some embodiments, as will be discussed below in greater detail, a bucket process, such as bucket process 10 of FIG. 1, may store data in a bucket of a plurality of buckets. Buckets may be stored in various storage devices as described further herein. A spare bucket may be reserved in the plurality of buckets. A copy of the data may be stored in the spare bucket. A pointer to the data in the bucket and a pointer to the copy of the data in the spare bucket may be updated based upon, at least in part storing the data in the bucket and storing the copy of the data in the spare bucket.

In some embodiments, the instruction sets and subroutines of bucket process 10, which may be stored on storage device, such as storage device 16, coupled to computer 12, may be executed by one or more processors and one or more memory architectures included within computer 12. In some embodiments, storage device 16 may include but is not limited to: a hard disk drive; all forms of flash memory storage devices; a tape drive; an optical drive; a RAID array (or other array); a random access memory (RAM); a read-only memory (ROM); or combination thereof. In some embodiments, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some embodiments, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some embodiments, computer 12 may include a data store, such as a database (e.g., relational database, object-oriented database, triplestore database, etc.) and may be located within any suitable memory location, such as storage device 16 coupled to computer 12. In some embodiments, data, metadata, information, etc. described herein may be stored in the data store. In some embodiments, computer 12 may utilize any known database management system such as, but not limited to, DB2, in order to provide multi-user access to one or more databases, such as the above noted relational database. In some embodiments, the data store may also be a custom database, such as, for example, a flat file database or an XML database. In some embodiments, any other form(s) of a data storage structure and/or organization may also be used. In some embodiments, bucket process 10 may be a component of the data store, a standalone application that interfaces with the above noted data store and/or an applet that is accessed via client applications 22, 24, 26, 28. In some embodiments, the above noted data store may be, in whole or in part, distributed in a cloud computing topology. In this way, computer 12 and storage device 16 may refer to multiple devices, which may also be distributed throughout the network(s).

In some embodiments, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like).

In some embodiments, bucket process 10 and/or storage management application 21 may be accessed via one or more of client applications 22, 24, 26, 28. In some embodiments, bucket process 10 may be a standalone application, or may be an applet, application, script, or extension that may interact with and/or be executed within storage management application 21, a component of storage management application 21, and/or one or more of client applications 22, 24, 26, 28. In some embodiments, storage management application 21 may be a standalone application, or may be an applet, application, script, or extension that may interact with and/or be executed within bucket process 10, a component of bucket process 10, and/or one or more of client applications 22, 24, 26, 28.

In some embodiments, one or more of client applications 22, 24, 26, 28 may be a standalone application, or may be an applet, application, script, or extension that may interact with and/or be executed within and/or be a component of bucket process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered)environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some embodiments, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android®, Apple® iOS®, Mac® OS X®; Red Hat® Linux®, Windows® Mobile, Chrome OS, Blackberry OS, Fire OS, or a custom operating system.

In some embodiments, one or more of client applications 22, 24, 26, 28 may be configured to effectuate some or all of the functionality of bucket process 10 (and vice versa). Accordingly, in some embodiments, bucket process 10 may be a purely server-side application, a purely client-side application, or a hybrid server-side/client-side application that is cooperatively executed by one or more of client applications 22, 24, 26, 28 and/or bucket process 10.

In some embodiments, one or more of client applications 22, 24, 26, 28 may be configured to effectuate some or all of the functionality of storage management application 21 (and vice versa). Accordingly, in some embodiments, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, bucket process 10, and storage management application 21, taken singly or in any combination, may effectuate some or all of the same functionality, any description of effectuating such functionality via one or more of client applications 22, 24, 26, 28, bucket process 10, storage management application 21, or combination thereof, and any described interaction(s) between one or more of client applications 22, 24, 26, 28, bucket process 10, storage management application 21, or combination thereof to effectuate such functionality, should be taken as an example only and not to limit the scope of the embodiments herein.

In some embodiments, one or more of users 46, 48, 50, 52 may access computer 12 and bucket process 10 (e.g., using one or more of client electronic devices 38, 40, 42, 44) directly through network 14 or through secondary network 18. Further, computer 12 may be connected to network 14 through secondary network 18, as illustrated with phantom link line 54. Bucket process 10 may include one or more user interfaces, such as browsers and textual or graphical user interfaces, through which users 46, 48, 50, 52 may access bucket process 10.

In some embodiments, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some embodiments, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some embodiments, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data mad requests (e.g., a request that content be read from computer 12).

Figure 2:
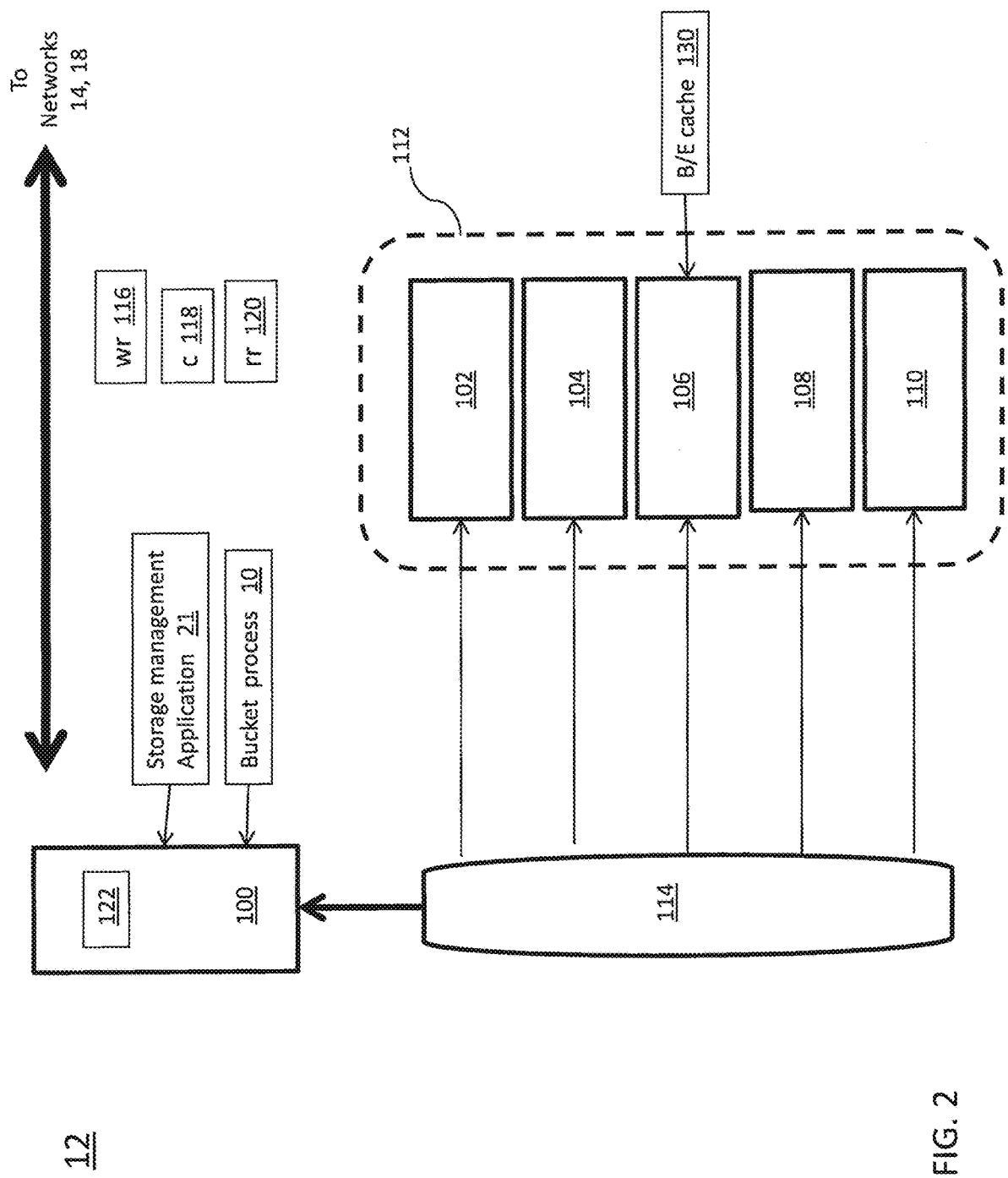
FIG. 2 is an example diagrammatic view of a storage system of FIG. 1.
Figure 3:
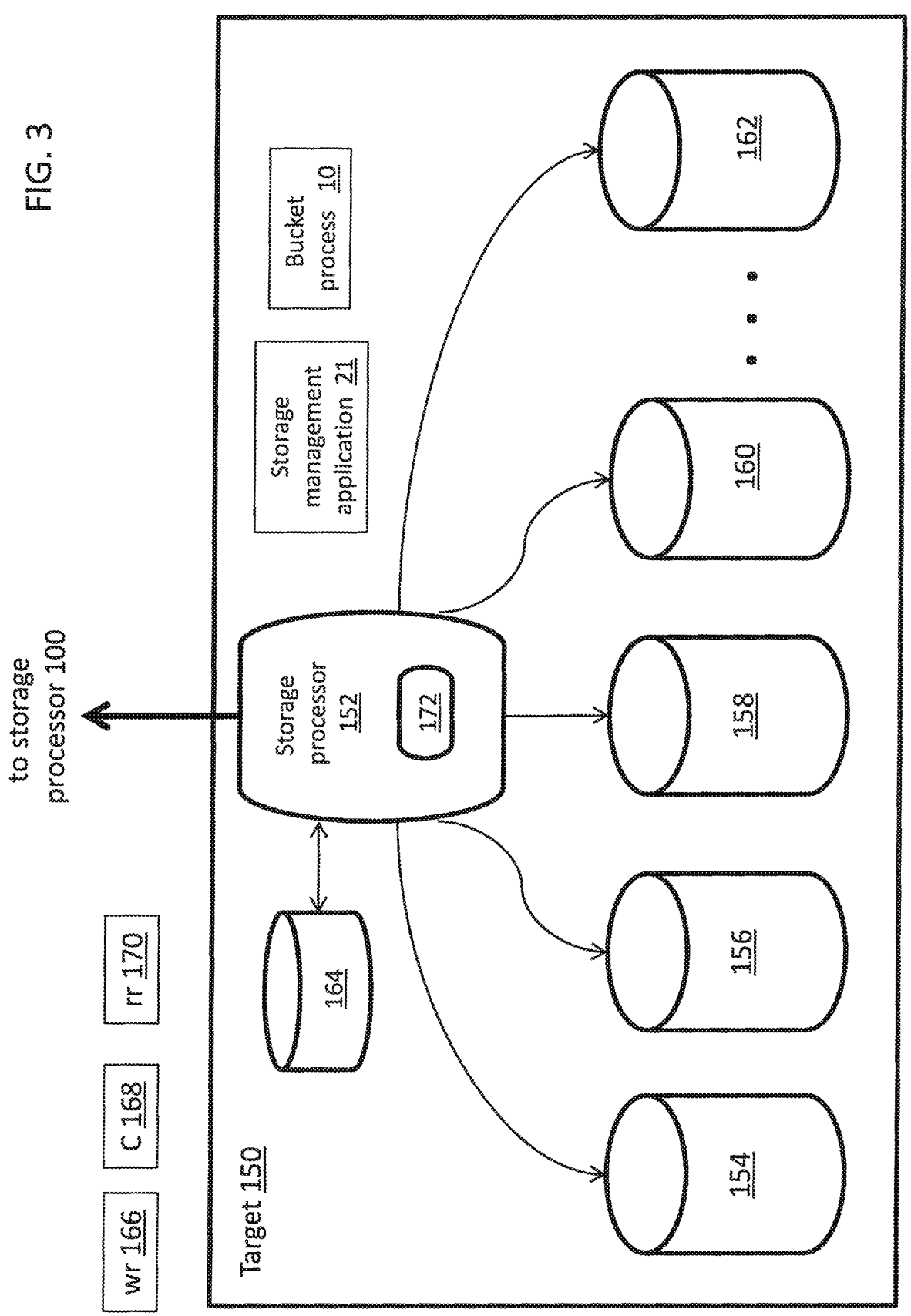
FIG. 3 is an example diagrammatic view of a storage target of FIG. 1.

Data Storage System:

Referring also to the example embodiments of FIGS. 1-3 (e.g., where computer 12 may be configured as a data storage system), computer 12 may include storage processor 100 and a plurality of storage targets (e.g., storage targets 102, 104, 106, 108, 110). In some embodiments, storage targets 102, 104, 106, 108, 110 may include any of the above-noted storage devices. In some embodiments, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the embodiments described herein.

While in this particular example computer 12 is shown to include five storage targets (e.g., storage targets 102, 104, 106, 108, 110), this is for example purposes only and is not intended limit the embodiments described herein. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some embodiments, one or more of storage targets 102, 104, 106, 108, 110 may be configured to store coded data (e.g., via storage management process 21), wherein such coded data may allow for the regeneration of data lost/ corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Non-limiting examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX system offered by Dell EMC™ of Hopkinton, Mass.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally, or alternatively (e.g., when storage processor 100 is configured as an application server or otherwise), these I/O requests may be internally generated within storage processor 100 (e.g., via storage management process 21). Examples of I/O request 15 may include but are not limited to a data write request 116 (e.g., a request that content 118 be written to computer 12) and data read request 120 (e.g., a request that content 118 be read from computer 12).

In some embodiments, during operation of storage processor 100, content 118 to be written to computer 12 may be received and/or processed by the storage processor 100 (e.g., via storage management process 21). Additionally, or alternatively (e.g., when storage processor 100 is configured as an application server or otherwise), content 118 to be written to computer 12 may be internally generated by the storage processor 100 (e.g., via storage management process 21).

As discussed above, the instruction sets and subroutines of the storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or bucket process 10) may be executed by one or more processors and one or more memory architectures included with data array 112.

In some embodiments, storage processor 100 may include a front end cache memory system 122. Examples of the front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some embodiments, storage processor 100 may initially store content 118 within the front end cache memory system 122. Depending upon the manner in which the front end cache memory system 122 is configured, the storage processor 100 (e.g., via storage management process 21) may immediately write content 118 to data array 112 (e.g., if the front end cache memory system 122 is configured as a write-through cache) or may subsequently write content 118 to data array 112 (e.g., if front end cache memory system 122 is configured as a write-back cache).

In some embodiments, one or more of storage targets 102, 104, 106, 108, 110 may include a backend cache memory system 130. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein the target 150 may be one example of a RAID implementation of, e.g., storage target 102, storage target 104, storage target 106, storage target 108, and/or storage target 110. An example of target 150 may include but is not limited to a VNX™ system offered by Dell EMC™ of Hopkinton, Mass. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some embodiments, target 150 may include a storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and is not intended to limit the embodiments described herein, as other configurations are possible. For example, storage devices 154, 156, 158, 160, 162 may be configured as a RAID 3, RAID 4, RAID 5 or RAID 6 array.

While in this particular example the target 150 is shown to include five storage devices (e.g., storage devices 154, 156, 158, 160, 162), this is for example purposes only and is not intended to limit the embodiments described herein. For instance, the actual number of storage devices may be increased or decreased depending upon, e.g., the level of redundancy/performance capacity required.

In some embodiments, one or more of storage devices 154, 156, 158, 160, 162 may be configured to store (e.g., via storage management process 21) coded data, wherein such coded data may allow for the regeneration of data lost or corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some embodiments, storage target 150 may execute all or a portion of storage management application 21 and the bucket process 10. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests and/or content (e.g., write request 166, content 168 and read request 170) to, e.g., storage target 150 (which is representative of storage targets 102, 104, 106, 108 and/or 110).

In some embodiments, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

A hash table is generally a data structure which implements an associative array abstract data type, a structure that may map keys to values. It uses a hash function to compute from a given key an index into an array of buckets, from which the desired value may be found. A basic requirement is that the hash function should provide a uniform distribution of hash values over the table size. We consider hash collisions resolution (where the hash function generates the same index for more than one key) by chaining entries with the same bucket. A fixed size hash table is a table with fixed number of buckets (N), each one having a fixed maximum number of entries (M). Example: a hash table includes 1,000,000 buckets, each one with maximal 256 entries rounded to the closest native block size, e.g., 4 KB.

Hardening a fixed size hash table includes saving this data structure into non-volatile memory with a read-modify-write update operation. It is assumed that the system hardens the hash table into a dedicated logical address space over persistent media (referred to as "tier"), i.e.:

bucket #0 resides at logical offset 0,
bucket #1 resides at offset bucket_size,
bucket #i resides at offset bucket_size * (i − 1)
bucket_size := 4KB (as in the example).

The above example does not guarantee write operation atomicity, i.e., if during write operation the system restarts or powers off, the logical block written to the tier might result with inconsistent data. Such an unreliable tier is common in storage systems where the logical blocks are written over a complex and non-native device media type, e.g., RAID over multiple disks or logical block that is larger than the device native block size. Due to this type of issue, in order to guarantee consistent data while working with such a tier, one must assure atomicity by its applicative logic. In-place lockless updates of a bucket over an unreliable tier may result with inconsistent data as the read-modify write operation atomicity is not guaranteed. In general, many storage systems attempt to solve this issue by excessive transactional journal implementations, which may result in an additional write overhead of the data to be updated, that will be used only upon failure.

Thus, as will be discussed below, the embodiments may enable updates to a fixed size hash table in a read-modify-write fashion which is lockless and highly scalable, while efficient in terms of metadata representation and CPU. The embodiments may include an applicative algorithm of assuring read-modify-write atomicity during hardening a fixed size hash table, and may include a space-efficient mapping kept in non-volatile memory, as well as an extra slot in non-volatile memory, which together will consist of the transaction needed for creating an atomic read-modify-write operation. Unlike other storage systems, as it is a lockless and totally independent implementation, the system may be easily scaled and enable multiple simultaneous updates.

Figure 4:
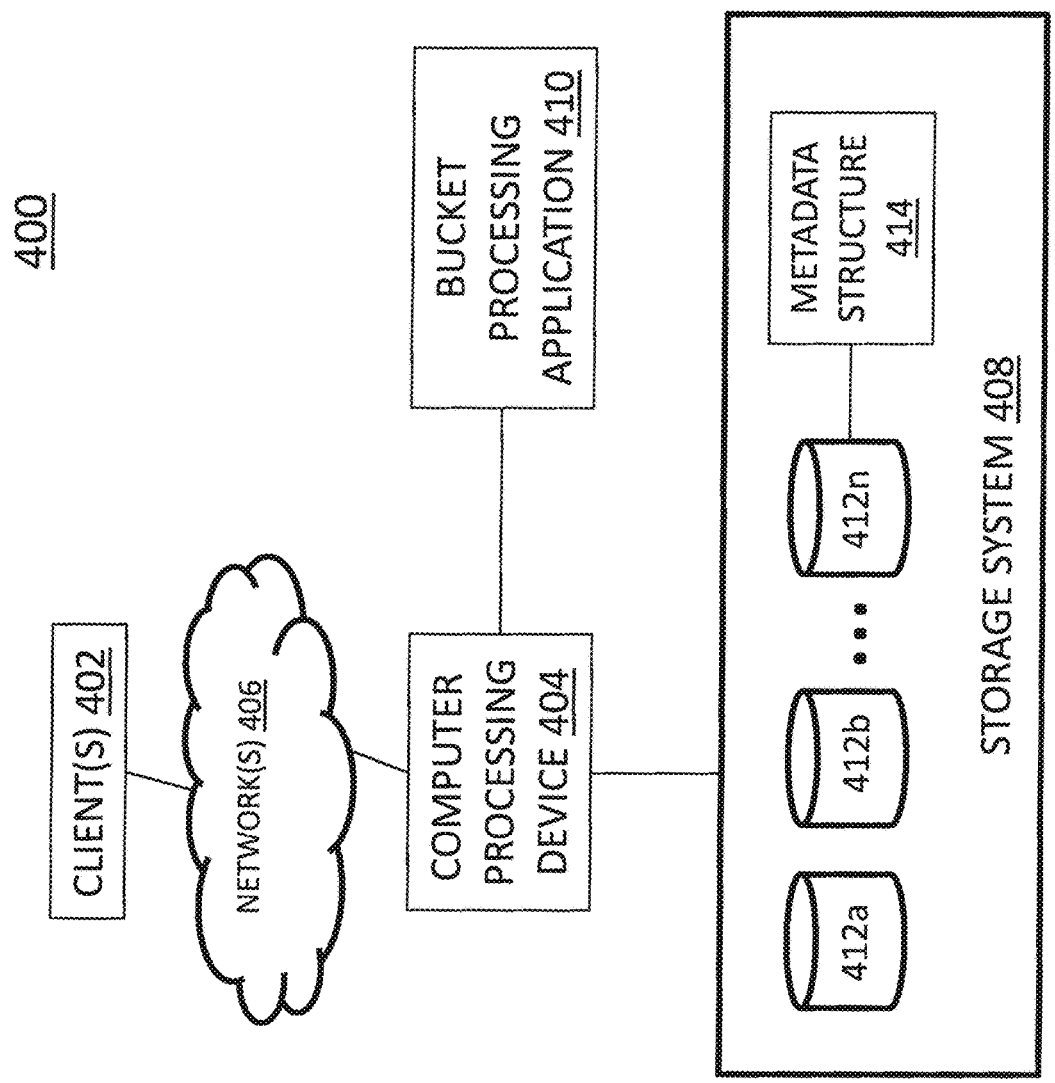
FIG. 4 is an example diagrammatic view of a system according to one or more embodiments.

As discussed above and referring also at least to the example embodiments of FIG. 4, bucket process 10 may store data in a bucket of a plurality of buckets. The bucket process 10 also may reserve a spare bucket in the plurality of buckets. The bucket process 10 may store a copy of the data in the spare bucket. The bucket process 10 may update a pointer to the data in the bucket and a pointer to the copy of the data in the spare bucket based upon, at least in part, storing the data in the bucket and storing the copy of the data in the spare bucket.

In some embodiments, bucket process 10 may store data in a bucket of a plurality of buckets. For example, the logical tier may be in the following structure:

list Size:=(#bucket*bucket size)+1 ("spare")

In some embodiments, buckets may be stored in a cyclic and consecutive manner over the n+1 slots.

In some embodiments, bucket process 10 may reserve a spare bucket in the plurality of buckets, and the spare bucket may be a next slot from the bucket. For example, along with the n buckets, bucket process 10 may reserve one slot as a spare_bucket, which represents the next slot to be written. In the example, the system does not assume anything regarding data in the spare slot (and therefore does not ever read it).

Non-limiting examples of a valid 5 buckets layout during system duration is as follows:

```
[bucket_3] [bucket_4] [spare_bucket] [bucket_0] [bucket_1]
[bucket_2]
[bucket_0] [bucket 1] [bucket_2] [spare_bucket] [bucket_3]
[bucket_4]
```

In some embodiments, bucket process 10 may use two metadata fields (e.g., pointers) as follows:
Head—states the index in which bucket 0 is located.
Spare—states the index in which spare_bucket is located.
In some embodiments, these fields will be kept in non-volatile memory. Since head states the index of the first bucket, and the spare states the next slot to be written (and does not present data which is necessarily valid), as well as the fact that buckets are stored in a consecutive manner, reading bucket i is performed by skipping i slots from the slot stated by head in a cyclic manner and skipping another slot if the slot stated by spare was reached at any point (also in a cyclic manner).

Non-limiting examples of reading are as follows:

```
Reading bucket_3:
[A] [B] [C] [D] [E] [F]
Head = 3
Spare = 2
```

From the metadata fields, the following is revealed:

```
[A] [B] [spare_bucket] [bucket_0] [E] [F]
Bucket_3 is at slot 0 (A).
Reading bucket_3:
[A] [B] [C] [D] [E] [F]
Head = 4
Spare = 1
```

From the metadata fields, the following is revealed:

```
[A] [spare_bucket] [C] [D] [bucket_0] [F]
Bucket_3 is locates at slot 2 (C).
```

In some embodiments, bucket process 10 may store a copy of the data in the spare bucket, and may update a pointer to the data in the bucket and a pointer to the copy of the data in the spare bucket based upon, at least in part, storing the data in the bucket and storing the copy of the data in the spare bucket, where updating the pointer to the copy of the data in the spare bucket may including pointing to the bucket storing the data. For example, updating bucket i may be performed as follows:
Read bucket i from slots in tier
Modify bucket
Write (store) bucket i into spare_bucket location
If i=0: Update head to be spare.
Update spare location to be s (previous bucket i location)
The "update head to be spare" and "update spare location to be s" must be performed atomically.

Example of several bucket updates are as follows:

```
Original state:
    [bkt_3] [bkt_4] [spare_bkt] [bkt_0] [bkt_1] [bkt_2]
    Head = 3
    Spare = 2
```

```
Update bucket_0:
    [bkt_3] [bkt_4] [updated_bkt_0] [spare] [bkt_1] [bkt_2]
    Head = 2
    Spare = 3
Update bucket_1 :
    [bkt_3] [bkt_4] [updated_bkt_0] [updated_bkt_1] [spare]
    [bkt_2]
    Head = 2
    Spare = 4
```

Performing the read-modify write operation in this manner guarantees atomicity, since bucket process 10 never writes bucket in-place, bucket process 10 either has the old or updated bucket copy. This means that at any point, if the system were to restart, the data would be completely consistent.

As presented, at no point is a bucket lock used in the process and uninterrupted reads while bucket process 10 simultaneously updates the same bucket is achieved. The system achieves a transaction which protects the read-modify operation at low costs: two members stating head and spare on non-volatile memory (compared to traditional bucket journaling (e.g., N×4K) which is a redundant additional full-page update (typically used only in failure)). The spare slot is generally insignificant as well, assuming the logical tier will consist of many buckets (just one spare regardless of the number of buckets).

In some embodiments, the plurality of buckets may be updated in a consecutive-cyclic manner. For example, updates may be in bucket consecutive order, since bucket updates the writes to the spare bucket, and the spare bucket location changes to the previous slot of the bucket that is updated. As described above, during bucket read we assume that buckets are stored in a cyclic and consecutive manner. Therefore, writing in non-consecutive order will result in breaking the invariant of the last point. For instance:

```
Original state:
    [bkt_3] [bkt_4] [spare_bkt] [bkt_0] [bkt_1] [bkt_2]
    Head = 3
    Spare = 2
Update bucket_0:
    [bkt_3] [bkt_4] [updated_bkt_0] [spare] [bkt_1] [bkt_2]
    Head = 2
    Spare = 3
Update bucket_2:
    [bkt_3] [bkt_4] [updated_bkt_0] [updated_bkt_2] [bkt_1]
    [spare]
    Head = 2
    Spare = 5
```

If the system were to read buckets 1-2 using the algorithm described above, the wrong bucket would be read. As such, bucket process 10 may update the buckets in a consecutive-cyclic (e.g., ascending) manner, meaning the buckets are updated in the following example:
0, 1, 2, . . . , i+1, . . . , n−1, 0, 1 . . .

As mentioned above, the buckets being hardened represent buckets of a uniformly distributed hash table, meaning updates will be distributed evenly on average. This means that if the tier has n buckets and k updates, on average each bucket will have k/n new updates. Therefore, if bucket i and bucket j have no pending updates, and there were k new updates for a complete hash table, it may be assumed that buckets i,j have k/n updates each. If bucket i were updated by the hardening algorithm, and afterward there were x additional updated to the system, it may be known that on average bucket i has x/n pending updates, while bucket j has (k+x)/n new updates. Therefore, there is no need in updating bucket i again, prior to the update of bucket j. This statement it true to all other n−2 buckets. This means that prior to bucket i being updated again, all other buckets must be updated. Accordingly, this is why it is possible (and beneficial) to take a consecutive bucket update approach.

The plurality of buckets may be divided between a fixed number of domains, wherein each domain of the fixed number of domains may be an instance of an independent logical tier, and wherein each domain of the fixed number of domains may include its own header and spare metadata member. For instance, the above-noted update algorithm may suffer from scaling issues, meaning it does not necessarily support two buckets being updated at the same time due to the fact that it uses a single spare slot for the next bucket update. However, scaling may still be achieved by introducing domains.

For example, the n buckets may be divided equally between a fixed number (d) of domains. Each domain may consist of a collection of n/d consecutive buckets. Each domain may implement the logical tier described above and may be of size ((n/d)+1)*bucket size. This means that each domain may in fact be an instance of an independent logical tier, which stores a group of buckets in a consecutive and cyclic manner, and therefore will have its own header and spare metadata members. Each domain may be updated as an independent unit, without any regard to other domains. For example:

---

2 domains, 6 buckets
Domain 0: [bkt_0] [bkt_1] [bkt_2] [spare]
    Head: 0; Spare: 3.
Domain 1: [bkt_3] [bkt_4] [bkt_5] [spare]
    Head: 0; Spare: 3
    Whereas domain 1 marks bkt3 as its first bucket (as stated in head).

---

The fixed number of domains is the scaling upper-bound of the tier, and therefore it is possible to update as many as d buckets at the same time (since ach domain can serve just one update at the same time). Bucket updates may be at a cyclic consecutive manner in a domain and may be in a round-robin fashion between domains.

For example:

---

2 domains, 6 buckets.
Original state:
    Domain 0: [bkt_0] [bkt_1] [bkt_2] [spare]
    Head: 0; Spare: 3.
    Domain 1: [bkt_3] [bkt_4] [bkt_5] [spare]
    Head: 0; Spare: 3
    Update bucket 0:
    Domain 0: [spare] [bkt_1] [bkt_2] [updated_bkt_0]
    Head: 3; Spare: 0.
    Domain 1: [bkt_3] [bkt_4] [bkt_5] [spare]
    Head: 0; Spare: 3
    Update buckets 1,3:
    Domain 0: [updated_bkt_1] [spare] [bkt_2] [updated_bkt_0]
    Head: 3; Spare: 1.
    Domain 1: [spare] [bkt_4] [bkt_5] [updated_bkt_3]
    Head: 3; Spare: 0
    Update bucket 4:
    Domain 0: [updated_bkt_1] [bkt_2] [bkt_2] [updated_bkt_0]
    Head: 3; Spare: 1.
    Domain 1: [updated_bkt_4] [spare] [bkt_5] [updated_bkt_3]
    Head: 3; Spare: 4.

---

The processes described above provide a means to update a hash table in an atomic read-modify-write fashion. In further embodiments described herein, a space-efficient method is provided for increasing the size of an otherwise fixed size hash table that is hardened over an unreliable tier. Thus, the embodiments describe a technique for hardening to a dynamic-sized hash table.

Turning now to FIG. 4, a system 400 for enabling expansion of the hash table hardened over an unreliable tier will now be described. The system 400 includes clients 402 communicatively coupled to a computer processing device 404 over one or more networks 406. The clients 402 may refer to one or more clients 38, 40, 42, and 44 shown in FIG. 1. The clients 402 may execute one or more applications (not shown), such as applications 22, 24, 26, and 28 shown in FIG. 1. The client applications may be configured to perform at least a portion of the bucket processes described herein. Networks 406 may refer to one or more of the networks described in FIG. 1 (networks 14, 18) and/or networks 14, 18, and 114 shown in FIG. 2. Likewise, the computer processing device 404 may refer to, e.g., the computer 12 of FIGS. 1 and 2, the storage processor 100 of FIG. 2 or the storage processor 172 of FIG. 3.

In embodiments, the computer processor 404 is communicatively coupled to a storage system 408. The storage system 408 may refer to, e.g., the storage device 16 of FIG. 1, the storage array 112 of FIG. 2, or the storage target 150 of FIG. 3. The storage system 408 includes storage devices 412a-412n, which may respectively refer to one or more of the storage devices 102-110 of FIG. 2, or devices 154-162 of FIG. 3. In an embodiment, the processor 404 is directly coupled to the storage system 408, e.g., over an InfinBand link, or may be coupled to the storage system 408 over a network, such as a local network, wide area network or Internet.

In embodiments, the computer processing device implements a bucket processing application 410 to perform the processes described herein. In embodiments, the bucket processing application 410 includes functionality described with respect to the bucket process 10 and the storage managing application 21 described above. In further embodiments, the storage system 408, which includes non-volatile memory, stores a metadata structure 414. The metadata structure 414 includes components described above with respect to the metadata fields (e.g., pointers for header and spare buckets). In addition, the metadata structure 414 may include an additional field for a split spare bucket, which is described further herein.

In embodiments, expansion of the hash table may be implemented in which the hash table (having n buckets) is configured into c*n buckets (where c>1 is defined to be the growth factor). The embodiments support reading from the hash table during the growth process making data accessible at all times. The processes described herein are also lockless, stateless, and space-optimal as its space consumption is c*n at any given time.

Hardening of a fixed size hash table can be executed for a data structure of a fixed and yet larger size in a straightforward manner by performing functional transformations on a hash function. For example:

Size of fixed-size-volatile-bash-table is n, and hardened-fixed-size-hash-table size is c*n.

A straight-forward mapping make take on the following form:

1/c of possible entries of bucket #i of the volatile hash table will map, and therefore be hardened, to bucket #i*c of the hardened hash table, 1/c of possible entries of bucket #i of the volatile hash table will map, and therefore hardened, to bucket #(i*c)+1 of the hardened hash table, . . . , 1/c of possible entries of bucket #i of the volatile hash table will map, and therefore hardened, to bucket #(i*c)+c−1 of the hardened hash table.

Mapping can be easily performed by analyzing more bits of the hash function resulting in a transformed function, which will determine the mapping to persistent buckets. This means that the full hash table will reside on non-volatile memory, and the hash table (which is in memory) will be a partial representation of it, and can be used as amortization and caching.

One motivation for hardening to bigger proportions is that volatile memory is in general more expensive than non-volatile memory, and therefore storing a massive data structure in volatile memory may not be cost-effective, and even not feasible, e.g., it may not be impossible to completely store a hash table of a certain size on volatile memory, and therefore it is stored on non-volatile memory. One motivation for hardening to a dynamic size hash table is improving amortization and reducing disk wearing, as well as the ability to adjust the hash table size to reflect the changing needs of the system.

A naïve way to expand the hash table is to write the enlarged hash table of size c*n into an entirely new space of the given size, followed by release of space of pre-increase hash table. This will result in a total of space consumption of n+c*n. Hardening of buckets cannot be in the simple form of sequentially hardening all buckets of a domain, followed by all buckets of the following domain. This is because any increase of the hash table size will result in buckets of a domain overwriting buckets of other domains. Thus, it is not feasible to maintain the existing domain structure while enlarging hash table size in a space efficient form.

As a result, the embodiments described herein provide for hardening of buckets in an interleaved form between domains as follows:

$$\text{Physical\_offset}(\text{Bucket}_{i,j}) = (D*J) + i$$

where:
D=Number of domains
i=Domain index
J=Bucket index (in domain)

In the form described above, any increase in the number of buckets will not force any bucket overwrite between domains and will naturally be resolved by mapping. For example, consider the hardening a hash table of two domains, with two buckets each, without the interleaving of buckets:

$B_{0,0}$ $B_{0,1}$ $B_{1,0}$ $B_{1,1}$

An increase of size to 4 buckets per domain is shown as:
$B_{0,0}$ $B_{0,1}$ $B_{0,2}$ $B_{0,3}$ $B_{1,0}$ $B_{1,1}$ $B_{1,2}$ $B_{1,3}$ This will cause buckets of domain 0 to overwrite the buckets of domain 1.

Now consider the hardening a hash table of two domains, with two buckets each, in an interleaved form:
$B_{0,0}$ $B_{1,0}$ $B_{0,1}$ $B_{1,1}$ An increase of size to 4 buckets per domain:
$B_{0,0}$ $B_{1,0}$ $B_{0,1}$ $B_{1,1}$ $B_{0,2}$ $B_{1,2}$ $B_{0,3}$ $B_{1,3}$ This results in no overwrite between domains. This also describes the physical location in which logical buckets of each domain will be stored.

Since domain logical buckets do not overlap in regards to physical offsets, a procedure of increasing the size of the hash table in the scope of a domain can be defined.

In the embodiments described herein, the increase in hardened hash table size allocation, which results in an increase in the number of buckets, is referred to herein as a split.

A split will require reservation of an additional slot per domain, regardless of the growth factor, which is referred to as split_spare_bucket (in addition to the already reserved spare_bucket).

An additional metadata field is added to the two existing ones (head, spare) and is referred to herein as split_spare, and it indicates the index in which the split_spare_bucket is located.

The split_spare_bucket will not be used while split is not active, and the metadata field indicating its location will point to the last index of the slots allocated, as well as will be ignored and skipped upon during hash table lookup. For example:

A domain with 4 buckets, during system activity, and not during split:
[$B_2$] [$B_3$] [$B_0$] [BX] [$B_1$] [BX]
Head=2 ($B_0$); Spare=3 (first BX).

Split_spare is the sixth bucket listed above (second BX) (based on the definition above).

The split algorithm may be defined as follows: a split from size N (bucket size) to size M (in number of logic bucket, N=4 for the example above) will use buckets $B_0, B_1, \ldots, B_{n-1}$, and will split them to buckets $\widetilde{B_0}, \widetilde{B_1}, \ldots, \widetilde{B_{m-1}}$. Each bucket $B_i$ will map to $$\left\lceil \frac{M}{N} \right\rceil$$

buckets $$\hat{B}_J, \ldots, \widetilde{B_{i+\lceil\frac{M}{N}\rceil-1}}.$$

Mapping will be marked $$\text{Map}(B_i) = \left\{ \hat{B}_j, \ldots, \widetilde{B_{i+\lceil\frac{M}{N}\rceil-1}} \right\}$$

Consider an example in which a domain with 4 buckets is being split to 6 buckets. A convenient form for viewing the mapping is by the division of each bucket $B_i$ into logical, equally sized, sub-buckets $B_{i,0}, B_{i,1}, B_{i,2}$:
$\widetilde{B_0} = B_{0,0} \cup B_{0,1}$
$\widetilde{B_1} = B_{0,2} \cup B_{1,0}$
$\widetilde{B_2} = B_{1,1} \cup B_{1,2}$
$\widetilde{B_3} = B_{2,0} \cup B_{2,1}$
$\widetilde{B_4} = B_{2,2} \cup B_{3,0}$
$\widetilde{B_5} = B_{3,1} \cup B_{3,2}$ where $\forall a, b, c, d: |B_{a,b}| = |B_{c,d}|$ in the sense of uniformity of hashes mapping to the bucket. Each post-split bucket is mapped to $$\left\lceil \frac{M}{N} \right\rceil = \left\lceil \frac{6}{4} \right\rceil = 2$$

pre-split buckets.

Note that mapped buckets can and will be shared by different mapping in case of growth factor $$\left(\frac{M}{N}\right)$$

not being a natural number. For example:

In the example above, $Map(B_1) \cap Map(B_2) = \overline{B_1} \neq \emptyset$

Split mapping is settled, its ordering and algorithm presents its most challenging issue—never writing in-place, keeping all data accessible at all time, while remaining space-efficient The hardened hash table is defined as a collection of buckets and spares: $B_0, B_1, \ldots, B_{n-1}, B_{spare}, B_{split}$ Buckets are at any time located sequentially (in a cyclic manner) and logically sequential buckets can be separated at most by $B_{spare}, B_{split}$. In other words, the hash table can be viewed as:

$B_{i_0}, B_{i_1}, \ldots, B_{i_{n-1}}, B_{i_n}, B_{i_{n+1}}$
 where $\forall (0 \le a \le n+1) \exists ((0 \le b \le n-1)$ or $(b \in \{spare, split\}))$: $B_{i_a} = B_b$ As well as:
$\forall (0 \le a \le n+1)$: if $i_a \in \{spare, split\}$:
$i_{((a+1)\% (n+1))} \in \{spare, split, ((i_a+1)\% (n+1))\}$ Once the split is initiated, the hash table, which consisted of n+2 slots, is given m-n additional slots. The split algorithm is defined as follows:

- current_slot = n + 1
- written_buckets = { }
- For a = 0 to n:
  - If $i_a$ = spare
    - spare = current_slot
    - current_slot = ((current_slot + 1)%(m + 2))
  - Else
    - For each bucket in Map($B_{i_a}$):
      - if head = $i_a$
        - head = current_slot
      - If bucket is not in written_buckets:
        - Write bucket to current_slot
        - current_slot = ((current_slot + 1)%(m + 2))
- split_spare = n The algorithm begins at the split_spare slot and writes mapped buckets according to their order in pre-split hash table, beginning at bucket located at slot 0, and progressing consecutively. The algorithm keeps head and spare pointing at the mapping-equivalent-slots. Note that as described above, since in cases of growth factor not being a natural number it is possible that $\exists i \ne j$: $Map(B_i) \cap Map(B_j) \ne \emptyset$, and therefore a collection of written buckets is kept for preventing the write of the same bucket multiple times.

The split ends in state of split_spare slot not the last in hash table, and therefore another split process cannot begin. To solve this, and be capable of splitting multiple times, the split_spare is used as an additional spare in a round-robin fashion along with the spare slot, until a hardening to bucket which is located at slot m+1 (the last slot) is initiated—split_spare will point to m+1 after hardening and will cease to be used until next split is initiated.

For example, for a complete split process:

As of the above example mapping, a domain with 4 buckets, which is being split to 6 buckets:

1. Prior to split:
   Head = 2; Spare = 3; Split = 5.
   $B_2$  $B_3$  $B_0$  X  $B_1$  X 2. Split initiated, Additional resources granted
   Head = 2; Spare = 3; Split = 5.
   $B_2$  $B_3$  $B_0$  X  $B_1$  X  X  X
3. Hardening Map($B_2$)
   $B_2$  $B_3$  $B_0$  X  $B_1$  $B_{2,0}$  X  X
                                     ∪ $B_{2,1}$
   $B_2$  $B_3$  $B_0$  X  $B_1$  $B_{2,0}$  $B_{2,2}$  X
                                     ∪ $B_{2,1}$  ∪ $B_{3,0}$
   Head = 2; Spare = 3; Split = Invalid.
4. Hardening Map($B_3$)
   $B_2$  $B_3$  $B_0$  X  $B_1$  $B_{2,0}$  $B_{2,2}$  $B_{3,1}$
                                     ∪ $B_{2,1}$  ∪ $B_{3,0}$  ∪ $B_{3,2}$
5. Hardening Map($B_0$)
   Head = 0; Spare = 3; Split = Invalid.
   $B_{0,0}$  $B_3$  $B_0$  X  $B_1$  $B_{2,0}$  $B_{2,2}$  $B_{3,1}$
   ∪ $B_{0,1}$                            ∪ $B_{2,1}$  ∪ $B_{3,0}$  ∪ $B_{3,2}$
   $B_{0,0}$  $B_{0,2}$  $B_0$  X  $B_1$  $B_{2,0}$  $B_{2,2}$  $B_{3,1}$
   ∪ $B_{0,1}$  ∪ $B_{1,0}$                   ∪ $B_{2,1}$  ∪ $B_{3,0}$  ∪ $B_{3,2}$
6. Hardening Map($B_1$)
   $B_{0,0}$  $B_{0,2}$  $B_{1,1}$  X  $B_1$  $B_{2,0}$  $B_{2,2}$  $B_{3,1}$
   ∪ $B_{0,1}$  ∪ $B_{1,0}$  ∪ $B_{1,2}$                ∪ $B_{2,1}$  ∪ $B_{3,0}$  ∪ $B_{3,2}$
   Head = 0: Spare = 3; Split = 4

The final state is:

| $\overline{B_0}$ | $\overline{B_1}$ | $\overline{B_2}$ | X | X | $\overline{B_3}$ | $\overline{B_4}$ | $\overline{B_5}$ |
|---|---|---|---|---|---|---|---|

Head = 0;
Spare = 3;
Split = 4

The hash table has grown by a growth factor of 1.5, in an in-place, space efficient fashion, but it cannot be split once more since split_spare=4, and for split to be initiated, split_spare must be of value 7.

As described above, following hardening will change the split_spare location:

1. Hardening $\overline{B_3}$
   $\overline{B_0}$  $\overline{B_1}$  $\overline{B_2}$  $\overline{B_3}$  X  X  $\overline{B_4}$  $\overline{B_5}$
   Head =0; Spare = 5; Split = 4
2. Hardening $\overline{B_4}$
   $\overline{B_0}$  $\overline{B_1}$  $\overline{B_2}$  $\overline{B_3}$  $\overline{B_4}$  X  X  $\overline{B_5}$
   Head = 0; Spare = 5; Split = 6
3. Hardening $\overline{B_5}$
   $\overline{B_0}$  $\overline{B_1}$  $\overline{B_2}$  $\overline{B_3}$  $\overline{B_4}$  $\overline{B_5}$  X  X
   Head = 0; Spare = 6; Split = 7

Now an additional increase in the hash table size may be initiated.

Figure 5:
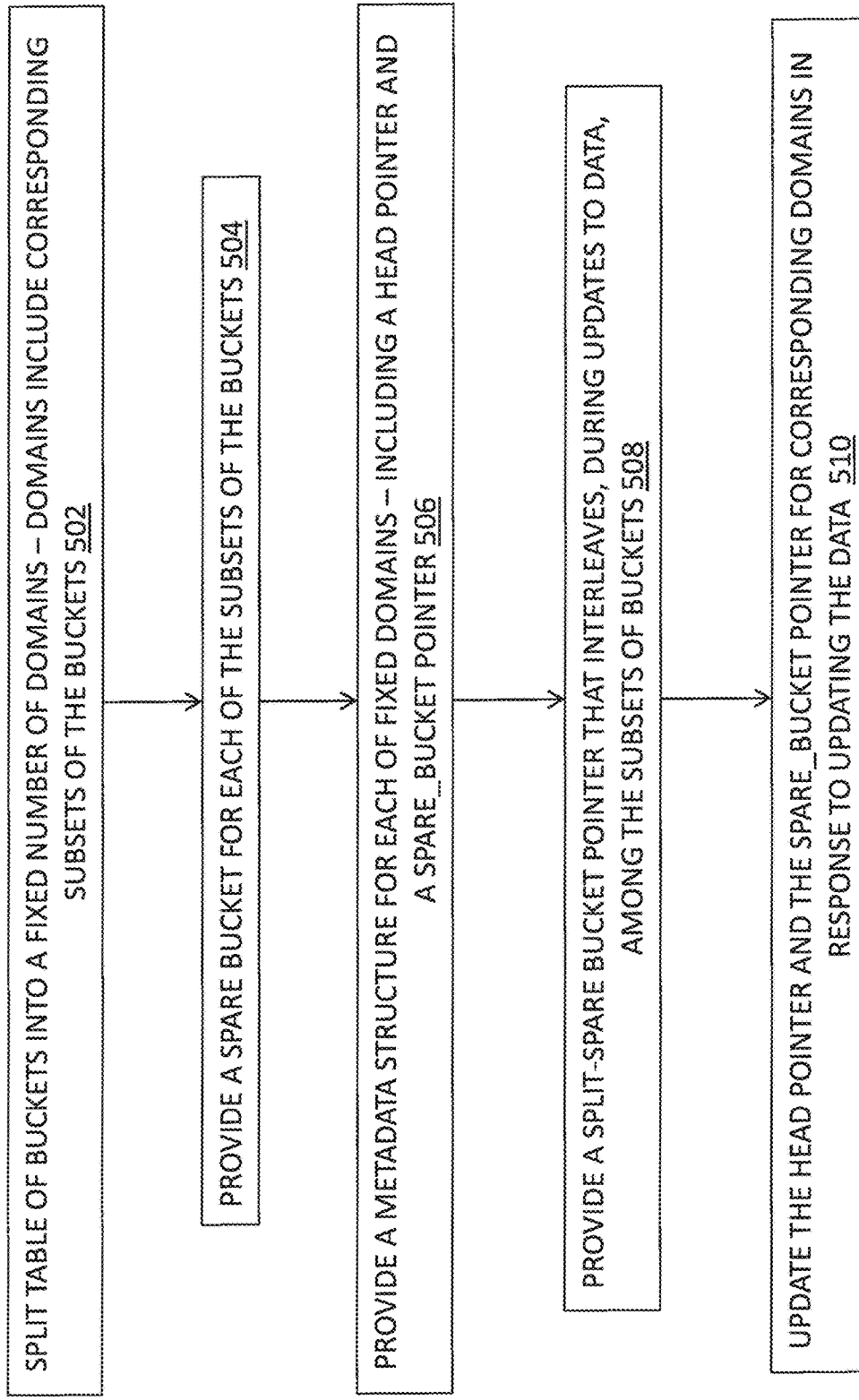
FIG. 5 is a flowchart of a bucket process according to one or more embodiments.

A process 500 for implementing this table expansion technique will now be described in FIG. 5. The process 500 may be implemented, e.g., via the bucket processing application 410 of FIG. 4.

In block 502, a table of buckets is split into a fixed number of domains, where each domain includes a corresponding subset of the buckets. In embodiments, the table of buckets reflects a hash table.

In block 504, the process 500 provides a spare bucket for each of the subsets of buckets and in block 506, the process 500 provides a metadata structure for each of the fixed number of domains. In some embodiments, the metadata structure may reflect the metadata structure 414 of FIG. 4. The metadata structure includes a head pointer that points to a first bucket of a corresponding subset of the buckets and a spare_bucket pointer that points to the spare bucket of the subset of the buckets.

In block 508, the process provides a split-spare bucket pointer that interleaves, during updates to data, among the subset of buckets in the domains. The data subject to the updates is stored in the spare bucket for a corresponding one of the domains. The split-spare bucket pointer may be stored and/or managed via the metadata structure 414 of FIG. 4.

In block 510, the process 500 updates the head pointer and the spare_bucket pointer for corresponding domains in response to updating the data.

Figure 6:
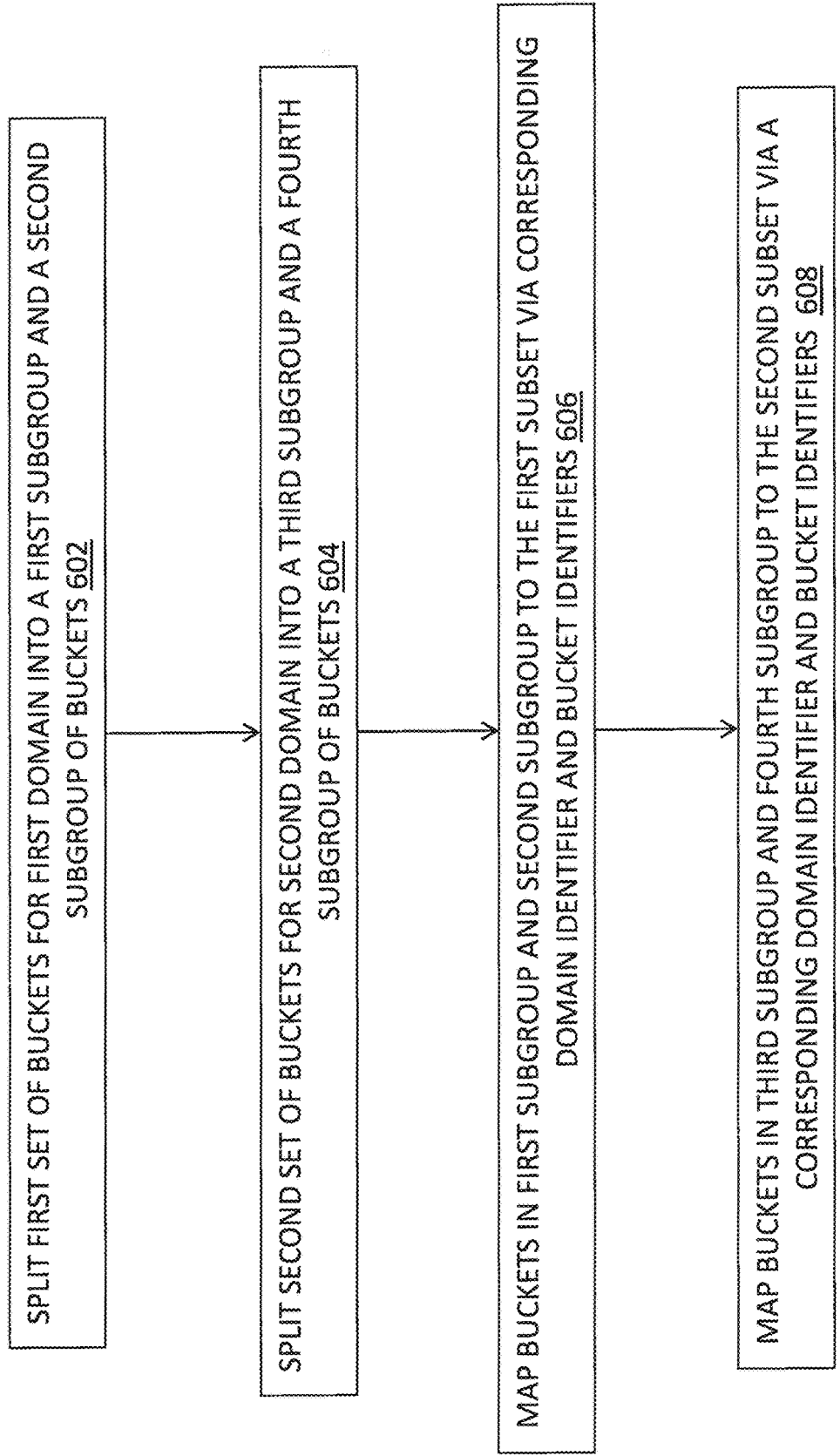
FIG. 6 is a flowchart of a bucket process according to FIG. 5 and one or more embodiments.

In embodiments, a subset of the buckets corresponding to a first domain of the fixed domains is referred to herein as a first subset and another subset of the buckets corresponding to a second domain of the fixed domains is referred to herein as a second subset. Turning to FIG. 6, a process 600, which may be integrated with the process 500 of FIG. 5, splits the first subset into a first subgroup of buckets and a second subgroup of buckets in block 602, and splits the other subset of the buckets into a third subgroup of buckets and a fourth subgroup of bucket in block 604.

The process 600 maps buckets in the first subgroup and the second subgroup to the first subset in block 606 and maps buckets in the third subgroup and the fourth subgroup to the second subset in block 608. The mapping can be implemented via a combined domain identifier and a corresponding bucket identifier. In an embodiment, and as described above, the mapping can be performed using bits of hash values associated with respective buckets. In embodiments, the process 600 is implemented via the bucket processing application 410 of FIG. 4.

The terminology used herein is for the purpose of describing particular embodiments only and is not intended to be limiting of the embodiments. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the embodiments has been presented for purposes of illustration and description but is not intended to be exhaustive or limited to the disclosure in the form disclosed. Many modifications, variations, substitutions, and any combinations thereof will be apparent to those of ordinary skill in the art without departing from the scope and spirit of the disclosure. The embodiment(s) were chosen and described in order to explain the principles of the disclosure and the practical application, and to enable others of ordinary skill in the art to understand the disclosure for various embodiment(s) with various modifications and/or any combinations of embodiment(s) as are suited to the particular use contemplated.

Having thus described the disclosure of the present application in detail and by reference to embodiment(s) thereof, it will be apparent that modifications, variations, and any combinations of embodiment(s) (including any modifications, variations, substitutions, and combinations thereof) are possible without departing from the scope of the embodiments defined in the appended claims.

What is claimed is:

1. A method comprising:
providing a table of buckets having a fixed number of domains, each of the domains including a corresponding subset of the buckets;
providing a spare bucket for each of the subsets of the buckets;
providing a metadata structure for each of the fixed number of domains, the metadata structure including a head pointer that points to a first bucket of a corresponding subset of the buckets and a spare_bucket pointer that points to the spare bucket of the corresponding subset of the buckets;
providing a split-spare bucket pointer that points to a split-spare bucket, the split-spare bucket being configured to receive sub-buckets during a split of the table, the split-spare bucket being used only when a split of the table is ongoing, such that the split-spare bucket is not used when a split of the table is not ongoing, and
updating the head pointer and the spare_bucket pointer for corresponding domains in response to updating the buckets.

2. The method of claim 1, wherein a subset of the buckets corresponding to a first domain of the fixed number of domains is a first subset and another subset of the buckets corresponding to a second domain of the fixed number of domains is a second subset, the method further comprising:
splitting the first subset into a first subgroup of buckets and a second subgroup of buckets; and
splitting the second subset of the buckets into a third subgroup of buckets and a fourth subgroup of bucket.

3. The method of claim 2, further comprising:
mapping buckets in the first subgroup and the second subgroup to the first subset; and
mapping buckets in the third subgroup and the fourth subgroup to the second subset;
wherein each mapping is implemented via a corresponding combined domain identifier and a corresponding bucket identifier.

4. The method of claim 1, wherein the head pointer is atomically updated to point to the spare bucket in response to detecting that contents of the first bucket have been copied into the spare bucket.

5. The method of claim 1, wherein the split-spare bucket is configured to occupy a last slot in the table before any given split of the tbale is initiated and the split-spare bucket is configured to occupy other than the last slot in the table while the given split is ongoing.

6. The method of claim 1, wherein the updating includes updating the buckets in a consecutive-cyclic manner.

7. The method of claim 1, wherein the metadata structure is stored in non-volatile memory.

8. A system comprising:
a memory having computer-executable instructions; and
a processor for executing the computer-executable instructions, the computer-executable instructions when executed by the processor cause the processor to perform operations, comprising
providing a table of buckets having a fixed number of domains, each of the domains including a corresponding subset of the buckets;
providing a spare bucket for each of the subsets of the buckets;

providing a metadata structure for each of the fixed number of domains, the metadata structure including a head pointer that points to a first bucket of a corresponding subset of the buckets and a spare_bucket pointer that points to the spare bucket of the corresponding subset of the buckets;

providing a split-spare bucket pointer that points to a split-spare bucket, the split-spare bucket being configured to receive sub-buckets during a split of the table, the split-spare bucket being used only when a split of the table is ongoing, such that the split-spare bucket is not used when a split of the table is not ongoiing; and updating the head pointer and the spare bucket pointer for corresponding domains in response to updating the buckets.

9. The system of claim 8, wherein a subset of the buckets corresponding to a first domain of the fixed number of domains is a first subset and another subset of the buckets corresponding to a second domain of the fixed number of domains is a second subset, the operations further comprising:

splitting the first subset into a first subgroup of buckets and a second subgroup of buckets; and splitting the second subset of the buckets into a third subgroup of buckets and a fourth subgroup of bucket.

10. The system of claim 9, wherein the operations further comprise:

mapping buckets in the first subgroup and the second subgroup to the first subset; and mapping buckets in the third subgroup and the fourth subgroup to the second subset;

wherein each mapping is implemented via a corresponding combined domain identifier and a corresponding bucket identifier.

11. The system of claim 8, wherein the head pointer is atomically updated to point to the spare bucket in response to detecting that contents of the first bucket have been copied into the spare bucket.

12. The system of claim 8, wherein the split-spare bucket is configured to occupy a last slot in the table before any given split of the table is initiated, and the split-spare bucket is configured to occupy other than the last slot in the table while the given split is ongoing.

13. The system of claim 8, wherein the updating includes updating the buckets in a consecutive-cyclic manner.

14. The system of claim 8, wherein the metadata structure is stored in non-volatile memory.

15. A computer program product embodied on a non-transitory computer readable medium, the computer program product including instructions that, when executed by a computer, cause the computer to perform operations, comprising:

providing a table of buckets having a fixed number of domains, each of the domains including a corresponding subset of the buckets;

providing a spare bucket for each of the subsets of the buckets;

providing a metadata structure for each of the fixed number of domains, the metadata structure including a head pointer that points to a first bucket of a corresponding subset of the buckets and a spare_bucket pointer that points to the spare bucket of the corresponding subset of the buckets;

providing a split-spare bucket pointer that points to a split-spare bucket, the split-spare bucket being configured to receive sub-buckets during a split of the table, the split-spare bucket being used only when a split of the table is ongoing, such that the split-spare bucket is not used when a split of the table is not ongoing; and and updating the head pointer and the spare_bucket pointer for corresponding domains in response to updating the bucket.

16. The computer program product of claim 15, wherein a subset of the buckets corresponding to a first domain of the fixed number of domains is a first subset and another subset of the buckets corresponding to a second domain of the fixed number of domains is a second subset, the operations further comprising:

splitting the first subset into a first subgroup of buckets and a second subgroup of buckets; and splitting the second subset of the buckets into a third subgroup of buckets and a fourth subgroup of bucket.

17. The computer program product of claim 16, wherein the operations further comprise:

mapping buckets in the first subgroup and the second subgroup to the first subset; and mapping buckets in the third subgroup and the fourth subgroup to the second subset;

wherein each mapping is implemented via a corresponding combined domain identifier and a corresponding bucket identifier.

18. The computer program product of claim 15, wherein the head pointer is atomically updated to point to the spare bucket in response to detecting that contents of the first bucket have been copied into the spare bucket.

19. The computer program product of claim 15, wherein the split-spare bucket is configured to occupy a last slot in the table before any given split of the table is initiated, and the split-spare bucket is configured to occupy other than the last slot in the table while the given split is ongoing.

20. The computer program product of claim 15, wherein the updating includes updating the buckets in a consecutive-cyclic manner.

* * * * *